United States Patent

[11] 3,620,753

[72] Inventors: Joseph Cremer, Hermulheim near Cologne; Heinz Harnisch, Lovenich; Friedrich Schulte, Hurth near Cologne; Arnulf Hinz, Knapsack near Cologne, all of Germany
[21] Appl. No. 888,911
[22] Filed Dec. 29, 1969
[45] Patented Nov. 16, 1971
[73] Assignee Knapsack Aktiengesellschaft, Knapsack, Germany
[32] Priority Dec. 27, 1968
[33] Germany
[31] P 18 17 127.2

[54] PROCESS FOR THE MANUFACTURE OF MINERAL CATTLE FOOD
15 Claims, No Drawings

[52] U.S. Cl. .................................... 99/2 I, 71/646, 71/41, 23/109
[51] Int. Cl. .................................... A23k 1/00, C05b 11/00, C01b 25/32
[50] Field of Search .................................... 71/41, 64 R, 62, 64 G; 99/2, 2 I; 23/108, 109

[56] References Cited

UNITED STATES PATENTS

| | | | |
|---|---|---|---|
| 3,443,956 | 5/1969 | Muller | 99/2 R |
| 3,467,495 | 9/1969 | Nielsson | 23/108 |
| 2,118,438 | 5/1938 | Lawrence | 71/64 |
| 2,021,671 | 11/1935 | Skinner | 23/109 |
| 2,137,674 | 11/1938 | MacIntire | 71/41 |
| 2,295,643 | 9/1942 | Emery | 99/2 R |
| 2,479,583 | 8/1949 | McHan | 99/2 R |

FOREIGN PATENTS

| | | | |
|---|---|---|---|
| 519,836 | 4/1940 | Great Britian | 99/2 I |

Primary Examiner—Norman Yudkoff
Assistant Examiner—Hiram H. Bernstein
Attorney—Connolly and Hutz

ABSTRACT: Production of mineral cattle food consisting of sodium, magnesium and calcium phosphates, wherein phosphoric acid, dolomite and sodium hydroxide solution are introduced into a long extended reaction zone, conveyed therethrough with constant agitation and reacted therein, and the resulting reaction product is dried.

PROCESS FOR THE MANUFACTURE OF MINERAL CATTLE FOOD

The phosphoric acid and the dolomite are introduced into the head portion of a reaction zone, the dolomite being used in the form of particles with a size of less than 0.1 mm., and the phosphoric acid being used in a concentration of between 10 and 50 weight percent; sodium hydroxide solution is added to the reaction mixture near a point in the reaction zone which the mixture has reached after a period of time of between 0.5 and 3.0 minutes; the resulting friable mixture is treated to comminute agglomerated matter with a particle size of more than 3 mm.; the comminuted matter is allowed to ripen, with constant agitation, during a period of time of between 1 and 10 minutes, at temperatures between 60° and 120° C., and a relative atmospheric moisture of more than 60 percent; and the resulting material is dried and freed from fines having a size of less than 100 microns, except for a maximum proportion of 35 weight percent, and the fines are recycled to material in the reaction zone, ahead of the ripening zone therein.

The present invention relates to a process for the manufacture of storable cattle food consisting of sodium magnesium and calcium phosphates, wherein phosphoric acid, dolomite and sodium hydroxide solution are introduced into a long extended reaction zone, conveyed therethrough with constant agitation, and reacted therein, and the resulting reaction product is dried.

The reaction products so made are dried and obtained then in the form of granules, or ground and dried, and obtained then in powder form. As time goes on during the storage of these mixed phosphates, it is found that they often coalesce more or less strongly to agglomerates. As a result, product handling and processibility are considerably handicapped or even rendered impossible. These caking phenomena are encountered regardless of whether the products are stored in bags or silos.

It has now unexpectedly been found that cattle food having a good storage life can be produced by the process of the present invention which comprises introducing phosphoric acid and dolomite into the head portion of a reaction zone, the dolomite being used in the form of particles with a size of less than 0.1 mm. preferably less than 0.04 mm., and the phosphoric acid being used in a concentration of between 10 and 50 weight percent, preferably 15 and 25 weight percent. Following this, sodium hydroxide solution is added near a point in the reaction zone which the above mixture has reached after a period of between 0.5 and 3.0 minutes, preferably 0.5 and 1.5 minutes. The resulting slightly friable mass having agglomerated matter therein is treated to comminute agglomerates having a size large than 3 mm. and the comminuted material is allowed to ripen, with constant agitation, during a period of between 1 and 10 minutes, preferably 1 and 5 minutes, at temperatures between 60° and 120° C., preferably 90 and 120° C., and a relative atmospheric moisture of more than 60 percent, preferably more than 90 percent.

The product so made is dried and freed then from fines having a size of less than 100 microns, preferably less than 40 microns, except for a maximum proportion of 35 weight percent, preferably less than 10 weight percent, and the fines are recycled to material in the reaction zone, at a place ahead of the ripening zone therein.

Only by the combination of all of the steps described hereinabove is it possible to successfully carry out the process of the present invention. Any failure to comply with all of these steps will be found to affect the flow properties of the final product, already after storage for some short period of time.

The process of the present invention can be carried out with the use of calcined dolomite, which preferably is gently calcined dolomite.

The feed materials should conveniently be used in a quantitative ratio such that a 1 percent aqueous solution or suspension of the final product have a pH-value of between 5 and 8, preferably 5 and 7.

The sodium hydroxide solution should preferably be used in a concentration of substantially 50 weight percent and should be introduced in finely divided form into the reaction zone.

The reaction product is easy to comminute prior to ripening it by the selection of a suitable flow velocity or by the selection of a suitable mixing device.

In the case of reactions, which practically are topochemical reactions, the final products' tendency to later cake together has been found to be chiefly occasioned by an incomplete neutralization of the feed materials, coupled with an inconsistent degree of saturation of the water of crystallization contained in the individual phosphate particles. During storage, especially under pressure, diffusion phenomena are noted to occur in cases like this, whereby the equilibrium is definitely established, possibly with further crystallization of the products to agglomerates. The tendency to cake together has also been found to be quite considerably influenced by the presence of relatively small proportions of finest particles, which cause the loose individual particles to become closely packed, naturally with the resultant formation of a maximum contact or reaction area.

EXAMPLE 1a 105 parts by weight of gently calcined dolomite (substantially 52 weight percent CaO and substantially 38 weight percent MgO), 375 parts by weight phosphoric acid (50 weight percent $P_2O_5$) and between about 600 and 700 parts by weight $H_2O$ were supplied per unit of time (limit of variation: ± 10 weight percent) near one of the end points of a paddle-type screw conveyor. The fine particulate dolomite of which 100 percent consisted of particles with a size smaller than 40 microns, the excess of phosphoric acid and the quantity of water supplied were found to effect rapid and complete reaction between the dolomite and phosphoric acid, termed herein first neutralization stage. After a sojourn time of 1.5 minutes, during which the reaction mixture travelled through the screw conveyor, there were added 190 parts by weight finely divided sodium hydroxide solution of substantially 50 weight percent strength, approximately near the center portion of the paddle-type screw conveyor, which was substantially 6 meters long. The now clotty or coarsely friable reaction mixture was allowed to ripen for substantially 6 minutes at about 70° C. and 90 percent relative atmospheric moisture. Following this, the reaction mixture was ground and dried and the Na–Ca–Mg–phosphate mixture was treated in an air separator so as to establish a maximum of 10 weight percent fines with a size of less than 40 microns therein. The remaining fines were recycled to the paddle-type screw conveyor and introduced thereinto, ahead of the ripening zone therein. The final product, stored over a period of 14 days in bags and silos, was free from hardening phenomena and possessed free-flow properties.

To determine its hardening behavior, the product was stored over 14 days in a warehouse in bituminized 50 kg. paper bags (10 bags superposed) or in test silos (600 ×3,000 mm.).

EXAMPLE 1b

The feed material and procedure were the same as those described in example 1a, save that the dolomite contained 60 weight percent particles with a size of >0.1 mm. Following the storage test, the product showed patches of slight hardening, which however were found to completely disappear under slight pressure. (No silo test was made in those cases in which the storage in bags was found to be accompanied by the occurrence of hardening phenomena.)

EXAMPLE 1c

The feed material and procedure were the same as those described in Example 1a, save that the sodium hydroxide solution was added immediately after the introduction of the dolomite and phosphoric acid into the paddle-type screw conveyor. In other words, practically no or only very little time was allowed for material to remain in the first neutralization stage. Following the storage test, the reaction product was found to have hardened. The bag-stored product disintegated into relatively small fragments, on handling it.

EXAMPLE 1d

The feed material and procedure were the same as those described in example 1a, save that the final product contained more than 30 percent particles with a size of less than 40 microns. Following the storage test, the bag-stored material was found to have hardened at a rate increasing from the uppermost to the lowermost bags. Merely fragments could be broken off by hand, i.e., near the upper peripheral portion of the bags. This was the best result obtained.

EXAMPLE 2a

The feed material and procedure were the same as those described in example 1a, save that the rotation speed of the paddle screw drier was doubled. Following the addition of sodium hydroxide solution, the reaction product was found to first transform into a fine friable mass and later into a mass consisting of fine spheroidal particles, near the end of the paddle screw drier. The product was cooled and passed through a sieve to isolate particulate matter with a size of between 0.5 and 2.5 mm. The granules was practically free from particle fractions with a size of less than 100 microns. The material was stored in bags and silos. The occurrence of caking phenomena was not observed and the product was found to possess free-flow properties.

EXAMPLE 2b

The feed material and procedure were the same as those described in example 2a, save that the dolomite contained 40 percent particles with a size of >0.1 mm. and that the reaction product was dried, immediately after introduction of the feed material. The reaction product so obtained was stored and found to cake together. The agglomerates could be crushed by hand.

EXAMPLE 2c

The feed material and procedure were the same as those described in example 2a, save that the final product, which consisted of loosely packed particles, contained more than 25 percent dust fines with a size of less than 60 microns. Following the storage test, the product was found to contain hardened material, predominantly near places with relatively large proportions of accumulated fines therein. The hardened material was found to disintegrated under mechanical stress.

We claim:

1. A process for the manufacture of cattle food consisting of sodium, magnesium and calcium phosphates, wherein phosphoric acid, dolomite and sodium hydroxide solution are introduced into a long extended reaction zone, conveyed therethrough with constant agitation and reacted therein, and the resulting reaction product is dried, which comprises the steps of:
   a. introducing the phosphoric acid and the dolomite into the head portion of a reaction zone, the dolomite being used in the form of particles with a size of less than 0.1 mm., and the phosphoric acid being used in a concentration of between 10 and 50 weight percent;
   b. adding sodium hydroxide solution to the step (a) reaction mixture near a point in the reaction zone which the mixture has reached after a period of time of between 0.5 and 3.0 minutes;
   c. treating the resulting friable mass having agglomerated matter therein to comminute agglomerates with a particle size of more than 3 mm. and allowing the comminuted matter to ripen, with constant agitation, during a period of time of between 1 and 10 minutes, at temperatures between 60° and 120° C., and a relative atmospheric moisture of more than 60 percent; and
   d. drying the resulting material and freeing it from fines having a size of less than 100 microns, except for a maximum proportion of 35 weight percent, and recycling the fines to material in the reaction zone, at a place ahead of the ripening zone therein.

2. The process as claimed in claim 1, wherein the dolomite is calcined dolomite and preferably is gently calcined dolomite.

3. The process as claimed in claim 1, wherein the feed materials are used in a quantitative ratio such that a 1 percent aqueous solution or suspension of the final product has pH-value of between 5 and 8.

4. The process as claimed in claim 1, wherein the sodium hydroxide solution is used in a concentration of about 50 weight percent.

5. The process as claimed in claim 1, wherein finely divided sodium hydroxide solution is introduced into the reaction zone.

6. The process as claimed in claim 1, wherein the reaction product is comminuted, prior to ripening it, by the selection of a suitable flow velocity or by the use of a suitable mixing device.

7. The process as claimed in claim 1, wherein the dolomite has a particle size of less than 0.04 mm.

8. The process as claimed in claim 1, wherein the phosphoric acid is used in a concentration of between 15 and 25 weight percent.

9. The process as claimed in claim 1, wherein the sodium hydroxide solution is added near a point in the reaction zone which the reaction mixture has reached after a period of time of between 0.5 and 1.5 minutes.

10. The process as claimed in claim 1, wherein the comminuted material is allowed to ripen for a period of time of between 1 and 5 minutes.

11. The process as claimed in claim 1, wherein the comminuted material is allowed to ripen at temperatures of between 90° and 120° C.

12. The process as claimed in claim 1, wherein the comminuted material is allowed to ripen at a relative atmospheric moisture of more than 90 percent.

13. The process as claimed in claim 1, wherein the dried product is freed from all particles having a size smaller than 40 microns.

14. The process as claimed in claim 1, wherein the dried product is freed from all particles having a size smaller than 100 microns, except for a maximum proportion of less than 10 weight percent.

15. The process as claimed in claim 1, wherein the feed materials are used in a quantitative ratio such that a 1 percent aqueous solution or suspension of the final product has a pH-value of between 5 and 7.

* * * * *